US009112417B2

(12) United States Patent
Fornage et al.

(10) Patent No.: US 9,112,417 B2
(45) Date of Patent: Aug. 18, 2015

(54) METHOD AND APPARATUS FOR PROVIDING POWER CONVERSION USING AN INTERLEAVED FLYBACK CONVERTER WITH AUTOMATIC BALANCING

(71) Applicant: Enphase Energy, Inc., Petaluma, CA (US)

(72) Inventors: Martin Fornage, Petaluma, CA (US); Mudhafar Hassan-Ali, Petaluma, CA (US); Tarik H. Omar, Truckee, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 14/028,349

(22) Filed: Sep. 16, 2013

(65) Prior Publication Data

US 2014/0016372 A1 Jan. 16, 2014

Related U.S. Application Data

(63) Continuation of application No. 12/284,985, filed on Sep. 26, 2008, now Pat. No. 8,537,572.

(60) Provisional application No. 60/995,784, filed on Sep. 28, 2007.

(51) Int. Cl.
*H02M 3/335* (2006.01)

(52) U.S. Cl.
CPC ................. *H02M 3/33507* (2013.01)

(58) Field of Classification Search
CPC ............ H02M 3/335; H02M 3/33507; H02M 3/33523; H02M 2001/0032

USPC .............. 363/21.12, 21.13, 21.18, 75–80; 323/282–285

See application file for complete search history.

(56) References Cited

U.S. PATENT DOCUMENTS

| 5,408,404 A | 4/1995 | Mitchell |
| 5,461,555 A | 10/1995 | Kitajima et al. |
| 5,508,903 A | 4/1996 | Alexndrov |

(Continued)

OTHER PUBLICATIONS

"Interleaving Contributes Unique Benefits for Forward and Flyback Converters," Texas Instruments On-Line Training Module Description, Module 01(ATECH3-5), 2005, Copyright 1995-2004 Texas Instruments Incorporated. Downloaded from web site http://training.ti.com/courses/coursedescription.asp?iCSID=50695 on Jun. 17, 2009.

(Continued)

*Primary Examiner* — Adolf Berhane
*Assistant Examiner* — Yemane Mehari
(74) *Attorney, Agent, or Firm* — Moser Taboada

(57) ABSTRACT

Method and apparatus for converting DC input power to DC output power. In one embodiment, the apparatus comprises a first flyback circuit and a second flyback circuit, coupled in parallel, for providing DC-to-DC conversion; and a controller for (i) determining a first peak current, based on a predetermined peak current, for operating the first flyback circuit, (ii) determining a second peak current, based on the predetermined peak current, for operating the second flyback circuit, and (iii) operating the first and the second flyback circuits at switching frequencies dependent on the first and the second peak currents, respectively, to achieve timing synchronization for interleaved operation of the first and the second flyback circuits.

20 Claims, 3 Drawing Sheets

(56) References Cited

U.S. PATENT DOCUMENTS

| | | | |
|---|---|---|---|
| 5,796,595 A * | 8/1998 | Cross | 363/71 |
| 5,838,552 A | 11/1998 | Fraidlin et al. | |
| 6,031,747 A | 2/2000 | Ilic et al. | |
| 6,348,781 B1 | 2/2002 | Midya et al. | |
| 6,771,519 B2 | 8/2004 | Frus et al. | |
| 6,809,678 B2 | 10/2004 | Vera et al. | |
| 7,554,826 B2 | 6/2009 | Hawley | |
| 2008/0257397 A1 * | 10/2008 | Glaser et al. | 136/244 |

OTHER PUBLICATIONS

Shaffer, Brian, "Interleaving Contributes Unique Benefits to Forward and Flyback Converters," Copyright 2005, Texas Instruments Incorporated, 31 pages. Downloaded from web site http://focus.ti.com/lit/ml/slup231/slup231.pdf on Jun. 17, 2009.

Zhang, Michael T. et al., "Analysis and Evaluation of Interleaving Techniques in Forward Converters," IEEE Transactions on Power Electronics, vol. 13, No. 4, Jul. 1998, pp. 690-698.

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.

"IEEE Recommended Practice for Utility Interface of Photovoltaic (PV) Systems," IEEE Std 929-2000, Approved Jan. 30, 2000, Copyright 2000 IEEE.

* cited by examiner

METHOD AND APPARATUS FOR PROVIDING POWER CONVERSION USING AN INTERLEAVED FLYBACK CONVERTER WITH AUTOMATIC BALANCING

CROSS-REFERENCE TO RELATED APPLICATIONS

The present invention is a continuation of co-pending U.S. patent application Ser. No. 12/284,985, filed Sep. 26, 2008, which claims benefit of U.S. provisional patent application Ser. No. 60/995,784, filed Sep. 28, 2007. Each of the aforementioned patent applications is herein incorporated in its entirety by reference.

BACKGROUND OF THE INVENTION

1. Field of the Invention

Embodiments of the present invention generally relate to power conversion and, more particularly, to a method and apparatus for performing power conversion using an interleaved flyback converter with automatic balancing.

2. Description of the Related Art

A number of switched mode (pulse width modulated) DC-to-DC converter topologies are available in the power electronics arts for performing DC-to-DC conversion. Such converters employ a flyback converter topology which is used in instances that require electrical isolation, voltage boost-up, and high efficiency. A flyback converter topology consists of a transformer, a switch (usually a power MOS FET transistor) and a diode. Typically, the switch is in series with the primary winding of the transformer and the secondary winding the transformer is serially coupled through the diode to a load. By switching a current through the primary coil, the DC voltage applied across the primary coil and switch is "boosted" to a higher voltage level at the load.

In order to double the output power available from a typical DC-to-DC converter, two flyback converters may be connected in parallel and operated in an interleaved fashion. Each of the flyback converters forms a "leg" of the overall DC-to-DC conversion process. Each leg is activated independently and in an interleaved manner. To facilitate a balanced operation such that the power is accurately converted from the input DC to the DC applied to the load, each leg must be "matched". To be able to exactly split the load in a balanced fashion across the legs and be able to activate one leg while the other leg is completely deactivated, the components of the two converters must exactly match each other. In practical implementations, this is simply not possible, which leads to misbehavior, i.e., activation and deactivation times are not synchronized and the load is not balanced. Such operation can lead to inefficient conversion and, in some instances, damage to the DC-to-DC converter circuitry.

Therefore, there is a need in the art for a method and apparatus for providing power conversion using interleaved flyback converters with automatic balancing.

SUMMARY OF THE INVENTION

Embodiments of the present invention generally relate to a method and apparatus for converting DC input power to DC output power. In one embodiment, the apparatus comprises a first flyback circuit and a second flyback circuit, coupled in parallel, for providing DC-to-DC conversion; and a controller for (i) determining a first peak current, based on a predetermined peak current, for operating the first flyback circuit, (ii) determining a second peak current, based on the predetermined peak current, for operating the second flyback circuit, and (iii) operating the first and the second flyback circuits at switching frequencies dependent on the first and the second peak currents, respectively, to achieve timing synchronization for interleaved operation of the first and the second flyback circuits.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
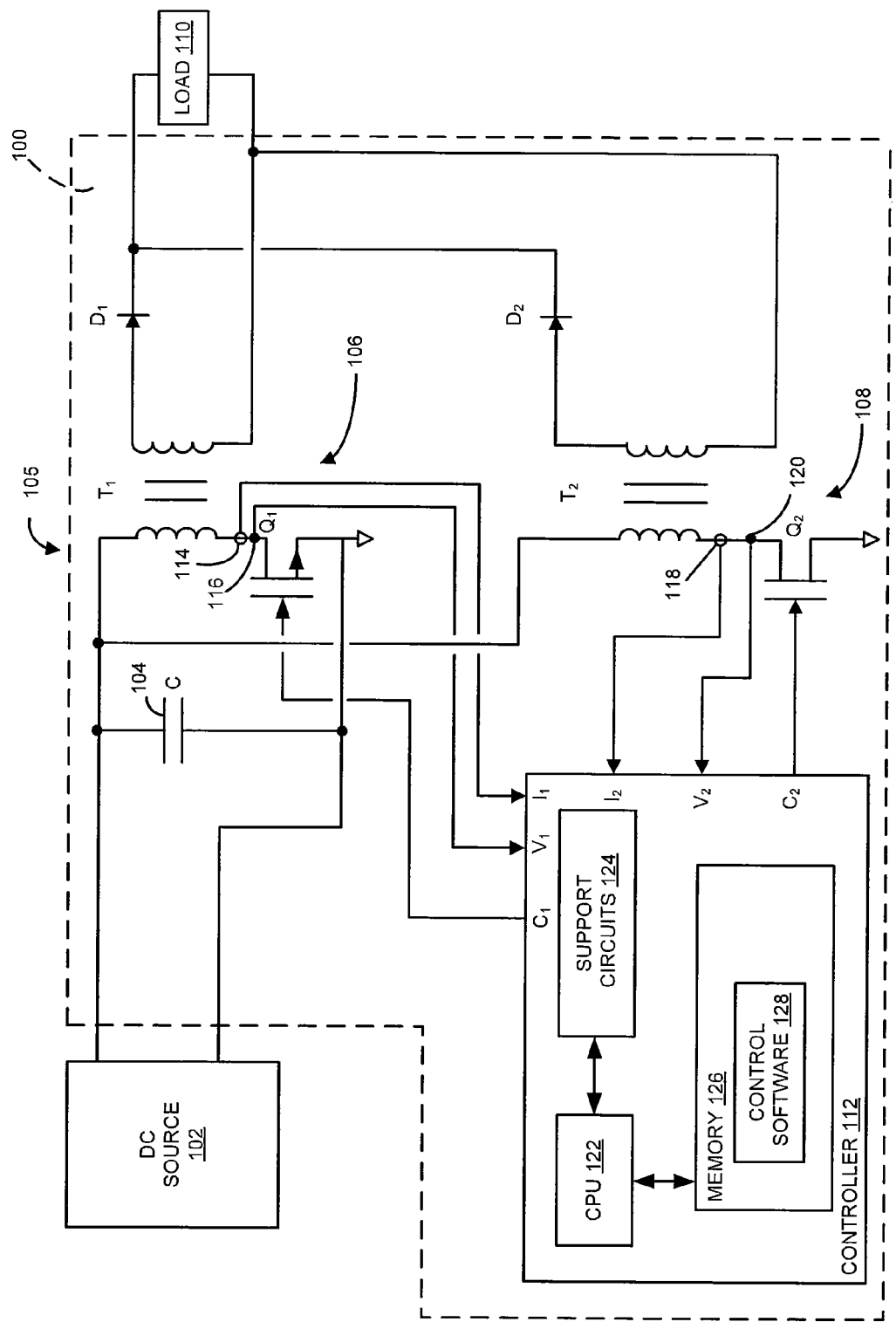
FIG. 1 is a schematic diagram of a DC-to-DC converter in accordance with one or more embodiments of the present invention.

FIG. 1 is a schematic diagram of a DC-to-DC converter 100 in accordance with one or more embodiments of the present invention. This diagram only portrays one variation of the myriad of possible DC-to-DC converter configurations. The present invention can function in a variety of power conversion environments including photovoltaic systems, DC-to-AC inverters, and other systems requiring DC-to-DC conversion.

The DC-to-DC converter 100 (an interleaved flyback converter) comprises a plurality of flyback circuits 105 such as first flyback circuit 106 and a second flyback circuit 108 coupled to a controller 112. The DC-to-DC converter converts DC voltage from a DC source 102 to a DC voltage for a load 110. The flyback circuits are arranged in a parallel manner with respect to the load and input DC source 102. The DC-to-DC converter comprises an input capacitor 104 that is used for storing energy to facilitate an accurate DC-to-DC conversion process when using a DC source 102 having limited current generation capability. The DC source 102 may be a photo voltaic (PV) panel or some other source of DC power. The load 110 may be a device that uses the DC power, including a DC-to-AC converter such that the circuit becomes a DC-to-AC inverter using the DC-to-DC converter 100 as the first stage of a DC-to-AC inversion process.

The first flyback circuit 106 comprises a transformer T1 and a switch Q1. The primary coil of the transformer is coupled in series to the switch Q1. The secondary coil of the transformer T1 is coupled through a diode D1 to a load 110. The flyback circuit 106, in one embodiment, uses a field effect transistor (FET) as the switch Q1. The gate of the transistor is coupled to the controller 112. The drain of the transistor is coupled to ground as well as to one terminal of the DC source 102, and the source of the transistor Q1 is coupled to the primary coil of the transformer T1. A capacitor 104 is coupled across the input to the flyback circuit 106 such that one terminal of the capacitor 104 is coupled to one terminal of the primary coil of the transformer T1, and the second terminal of the capacitor 104 is coupled to the drain of the transistor Q1 (i.e., ground).

In a similar manner, the second flyback circuit 108 comprises a transformer T2 and a switch Q2 which is, for example, a field effect transistor Q2. The drain of the transistor Q2 is coupled to ground. The gate of the transistor Q2 is coupled to the controller 112, and the source of the transistor Q2 is coupled to the primary coil of transformer T2. The second terminal of the transformer T2 is coupled to the first terminal of the capacitor 104. In this manner, the input of the flyback circuit 108 is coupled in parallel with the input of the flyback circuit 106. The output of the flyback circuit 108 formed by the secondary coil of transformer T2 is coupled through a diode D2 to the load 110. In this manner, the output of the flyback circuit 108 is coupled in parallel with the output of the flyback circuit 106.

Between the primary coil and the switch of each flyback circuit 106, 108 is a current monitoring element 114, 118 and a voltage monitoring element 116, 120. The voltage and current monitored in each flyback circuit 106, 108 is coupled to the controller 112 to control activation timing of each of the legs (circuits 106, 108) of the DC-to-DC converter 100 and to achieve automatic load balancing.

The controller 112 comprises a central processing unit (CPU) 122, support circuits 124 and memory 126. The CPU 122 may be a form of processor, microprocessor, microcontroller including an application specific integrated circuit (ASIC). The support circuits 124 comprise well known circuits that support the functionality of the CPU 122 including power supplies, clock circuits, bus circuits, interface circuits and the like. The memory 126 comprises random access memory, read only memory, and combinations thereof. The memory 126 stores the control software 128 that is executed by the CPU 122 to control the operation of the interleaved flyback circuits 106 and 108. To facilitate digital control, the signals from the sensors 114, 116, 118 and 120 are converted from analog signals to digital signals using analog-to-digital conversions (ADC) that may stand-alone or be part of the controller 112.

In operation, the controller 112 processes the sensor signals to derive timing signals for the switches Q1 and Q2 to achieve timing synchronization and load balancing for the interleaved flyback circuits 106 and 108. The use of interleaved flyback circuits reduces ripple current in the output power, doubles the ripple frequency to facilitate simplified filtering to remove the ripple, and doubles the output power of the converter. Interleaving functions best when the activation and deactivation cycles of each flyback circuit are exactly 180 degrees out of phase. For embodiments of the present invention to achieve automatic balancing and timing accuracy, the conversion frequency of the converter must be dependent upon the current ($I_P$) through the transformer primary coil. The nature of the signal processing used to achieve balance and timing accuracy is discussed with respect to FIG. 3 below.

Although the DC-to-DC converter 100 of FIG. 1 depicts two flyback circuits 106, 108 operating in parallel, the invention can be expanded to any number of flyback circuits coupled in parallel.

Figure 2:
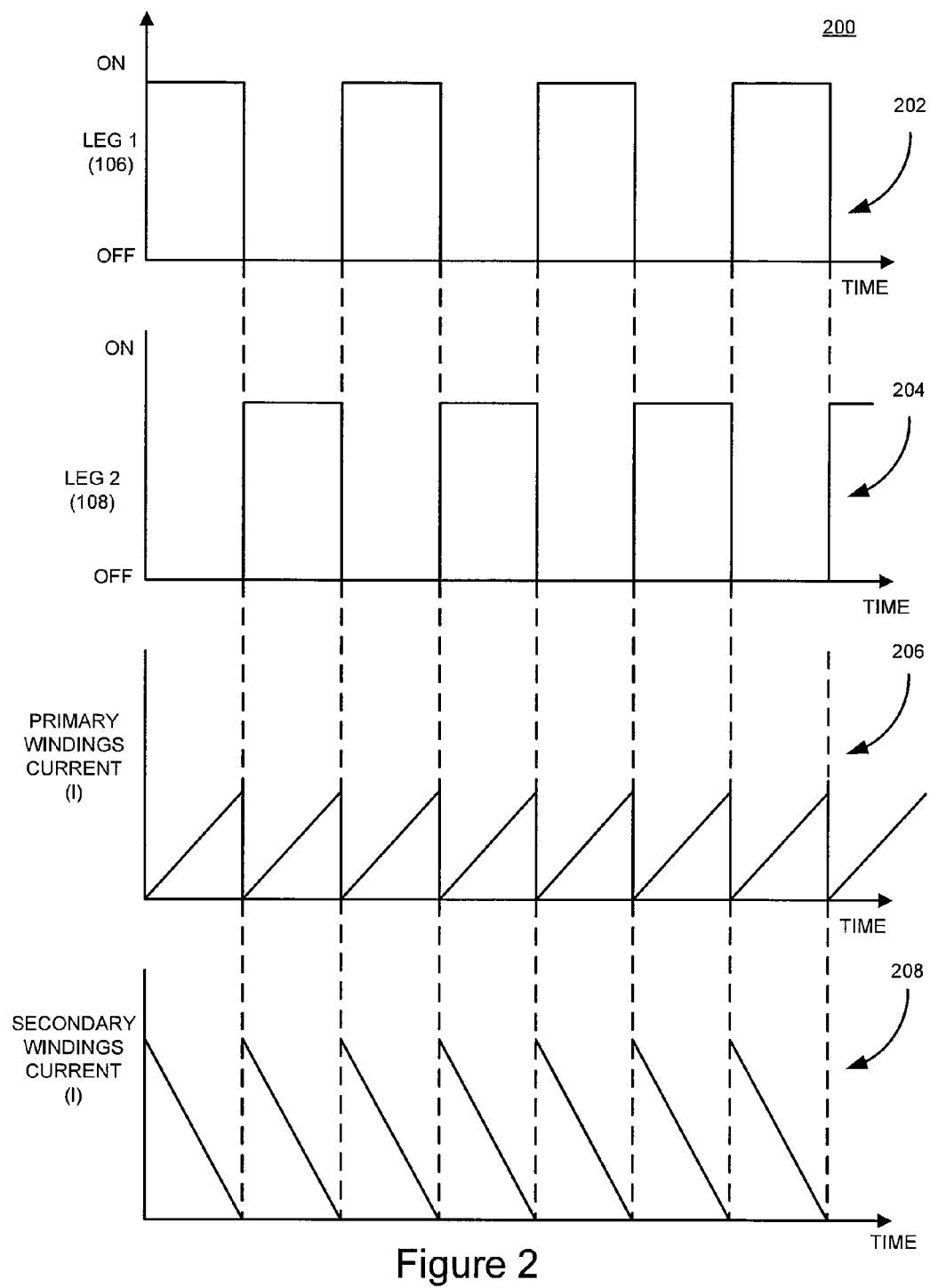
FIG. 2 is a timing diagram of the signals used within the DC-to-DC converter of FIG. 1.

FIG. 2 depicts the relative timing of signals used within the DC-to-DC converter 100 of FIG. 1 in accordance with one embodiment of the invention. Graphs 202 and 204 depict the activation and deactivation times of each leg (each flyback circuit 106, 108) within the DC-to-DC converter 100. Each leg is operated on an interleaved manner such that one leg is activated while the other leg is deactivated and vice versa. The graph 206 shows the composite current through the primary windings where the primary winding current flows through each transformer when an associated leg is active. As such, there is no time when current is not flowing through one of the primary windings. The secondary winding current shown at graph 208 depicts the repetitive nature of the current flowing from the secondary windings. In a single stage flyback circuit, there is always a substantial period of time when the current is not flowing through the primary or secondary winding. Such deactivation causes a substantial ripple in the output DC voltage. By using a plurality of legs that are switched in an interleaved manner, current is continuously coupled to the load and the amount of ripple in the output DC voltage is significantly reduced. In addition, the use of parallel connected flyback circuits enables the output power to be substantially increased to the load, e.g., for two circuits, the available power is doubled.

Due to the mismatch in the components of the two interleaved legs, two issues arise: (1) the signal timing does not match on both legs, resulting in unsynchronized operation of the two legs (e.g., both legs may be active simultaneously) and (2) the load does not distribute equally on both legs due to the mismatch in other parts of the circuits such as a digital-to-analog converter in the sensing circuits used to monitor the current and voltage. Specifically, if the two transformers T1 and T2 primary coil winding inductances ($L_{P1}$ and $L_{P2}$) do not match, then the switching timing and the power delivered by each transformer will be different in each leg. In order to mitigate these issues, embodiments of the present invention utilize two techniques to improve timing synchronization and load balancing.

One embodiment of the invention uses timing equalization to ensure that the timing in each leg is accurate and there is no overlap between the active time of leg operation. For a given primary current ($I_P$) the $T_{ON}$ and $T_{OFF}$ times are determined. Hence, if there is a mismatch between $L_{P1}$ and $L_{P2}$, then the required $I_P$ is modified for leg 1 and leg 2, i.e., resulting in two current values:

$$I_{P1}=I_P+\alpha_1$$

$$I_{P2}=I_P+\alpha_2$$

Where the parameters $\alpha_1$ and $\alpha_2$ are the adjustment factors that are proportional to phase error. By adding $\alpha_1$ and $\alpha_2$ to the desired current ($I_P$), the active time for each leg ($T_{ON1}$ and $T_{ON2}$) are made equal. The parameters are estimated as follows:

In one embodiment, $\alpha_1=0$ and $\alpha_2$ is adjusted to achieve the proper timing such that one flyback circuit (i.e., termed the master leg) has fixed timing and the other flyback circuit (i.e., termed the slave leg) is adjusted. Although such a compensation technique is sufficient for many applications, it can produce a fluctuation in the total output power as $\alpha_2$ is adjusted.

In detail, at startup, the first leg (leg 1) activates by turning Q1 on until $I_P$ is reached, at which time transistor Q1 is turned off.

In subsequent cycles, the interleaving phase (time) between the falling edge of the on period of leg 1 and the rising edge of the on period of leg 2 is measured as a period $\tau$ using, for example, a 25 MHz clock sampling clock.

The result, which could be positive or negative, is then used to derive $\alpha_1$ and $\alpha_2$ as:

$$\alpha_1=0 \rightarrow I_{P1}=I_P$$

$$\alpha_2=\tau \rightarrow I_{P2}=I_P+\tau$$

Note that τ can be either a positive or a negative number, i.e., the factor can be either decremented or incremented, but in complementary fashion. Thus, timing accuracy is achieved and maintained.

In an alternative embodiment, the controller measures the previous cycle duration for one of the flyback circuits (i.e., termed the master leg). A "zero error point" is derived as one-half the duration of the master cycle. This zero error point is used as the activation point for the other flyback circuit (i.e., termed the slave leg).

Figure 3:
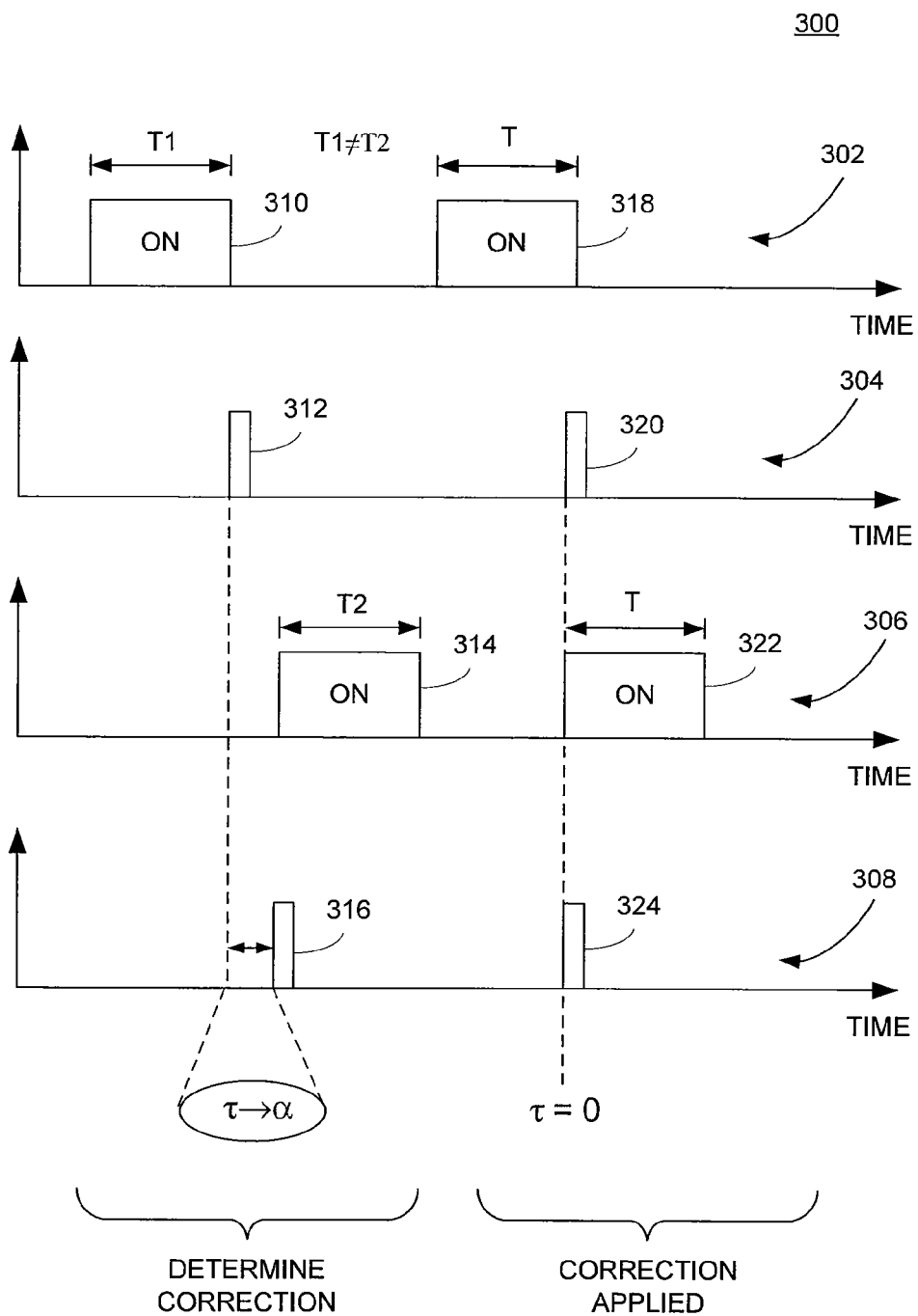
FIG. 3 is a timing diagram representing the automatic signal balancing within the DC-to-DC converter that occurs in accordance with one embodiment of the invention.

FIG. 3 depicts the process discussed above, wherein the "on" times in the first cycle are shown as T1 and T2 at 310 and 314. The pulses that start the "on" time are shown at 312 and 316. The delay between periods T1 and T2 is shown as the period τ. During period of the first cycle, the correction a is determined. Then, α is used to adjust the timing of the flyback beginning at the circuits to achieve a τ equal to zero, where the end of the "on" time 318 of the first leg and the "on" time 322 of the second leg are aligned such that activation periods do not overlap. The switching pulses are also aligned at 320 and 324 to form a τ equal to zero.

In another embodiment, both $\alpha_1$ and $\alpha_2$ have value such that both $I_{P1}$ and $I_{P2}$ are adjusted in a complementary fashion. Because of the complementary adjustment, the total output power is substantially constant while the adjustment is occurring. In this embodiment, $$I_{P1} = I_P + \alpha_1$$

$$I_{P2} = I_P + \alpha_2$$

By determining α, timing synchronization is automatically achieved. As such, the interleaved flyback circuits form an efficient DC-to-DC converter.

In the embodiments described above, the controller forms part of a phase locked loop (PLL) using a proportional control technique, i.e., the correction is proportional to the error. An alternative controller may use an alternative technique such as a proportional integral technique or a proportional-integral-derivative (PID) technique.

While the foregoing is directed to embodiments of the present invention, other and further embodiments of the invention may be devised without departing from the basic scope thereof, and the scope thereof is determined by the claims that follow.

The invention claimed is:

1. An apparatus for converting power comprising:
a first flyback circuit and a second flyback circuit, coupled in parallel, for providing DC-to-DC conversion; and
a controller for (i) determining a first peak current, based on a predetermined peak current, for operating the first flyback circuit, (ii) determining a second peak current, based on the predetermined peak current, for operating the second flyback circuit, and (iii) operating the first and the second flyback circuits at switching frequencies dependent on the first and the second peak currents, respectively, to achieve timing synchronization for interleaved operation of the first and the second flyback circuits.

2. The apparatus of claim 1, wherein the first and the second peak currents are determined such that switching cycles of the first and the second flyback circuits are exactly 180 degrees out of phase.

3. The apparatus of claim 1, wherein the first and the second peak currents are determined such that switching on-periods for the first and the second flyback circuits are equal.

4. The apparatus of claim 1, wherein the first and the second peak currents are further determined based on at least one adjustment factor proportional to a phase error between switching cycles of the first and the second flyback circuits.

5. The apparatus of claim 4, wherein the first peak current is equal to the predetermined peak current and the second peak current is equal to the predetermined peak current plus an adjustment factor proportional to the phase error.

6. The apparatus of claim 4, wherein the first peak current is equal to the predetermined peak current plus a first adjustment factor proportional to the phase error, and the second peak current is equal to the predetermined peak current plus a second adjustment factor proportional to the phase error.

7. The apparatus of claim 6, wherein the first and the second adjustment factors are determined such that the first and the second peak currents are adjusted in a complementary fashion.

8. The apparatus of claim 4, wherein the phase error is measured between a falling edge of a switching on-period of the first flyback circuit and a rising edge of a subsequent switching on-period of the second flyback circuit.

9. The apparatus of claim 4, wherein the phase error is determined based on one-half of a duration of a previous switching cycle of the first flyback circuit.

10. A method for converting power using a plurality of flyback circuits coupled to one another in parallel, comprising:
determining a first peak current, based on a predetermined peak current, for operating a first flyback circuit in the plurality of flyback circuits;
determining a second peak current, based on the predetermined peak current, for operating a second flyback circuit in the plurality of flyback circuits; and
operating the first and the second flyback circuits at switching frequencies dependent on the first and the second peak currents, respectively, to achieve timing synchronization for interleaved operation of the plurality of flyback circuits.

11. The method of claim 10, wherein the first and the second peak currents are determined such that switching cycles of the first and the second flyback circuits are exactly 180 degrees out of phase.

12. The method of claim 10, wherein the first and the second peak currents are determined such that switching on-periods for the first and the second flyback circuits are equal.

13. The method of claim 10, wherein the first and the second peak currents are further determined based on at least one adjustment factor proportional to a phase error between switching cycles of the first and the second flyback circuits.

14. The method of claim 13, wherein the first peak current is equal to the predetermined peak current and the second peak current is equal to the predetermined peak current plus an adjustment factor proportional to the phase error.

15. The method of claim 13, wherein the first peak current is equal to the predetermined peak current plus a first adjustment factor proportional to the phase error, and the second peak current is equal to the predetermined peak current plus a second adjustment factor proportional to the phase error.

16. The method of claim 15, wherein the first and the second adjustment factors are determined such that the first and the second peak currents are adjusted in a complementary fashion.

17. The method of claim 13, wherein the phase error is measured between a falling edge of a switching on-period of the first flyback circuit and a rising edge of a subsequent switching on-period of the second flyback circuit.

18. The method of claim 13, wherein the phase error is determined based on one-half of a duration of a previous switching cycle of the first flyback circuit.

19. A system for converting power comprising:

a photovoltaic (PV) module; and a flyback converter, coupled to the PV module for receiving DC power, wherein the flyback converter comprises:

a first flyback circuit and a second flyback circuit, coupled in parallel, for providing DC-to-DC conversion; and a controller for (i) determining a first peak current, based on a predetermined peak current, for operating the first flyback circuit, (ii) determining a second peak current, based on the predetermined peak current, for operating the second flyback circuit, and (iii) operating the first and the second flyback circuits at switching frequencies dependent on the first and the second peak currents, respectively, to achieve timing synchronization for interleaved operation of the first and the second flyback circuits.

20. The system of claim 19, wherein the first and the second peak currents are determined such that switching cycles of the first and the second flyback circuits are exactly 180 degrees out of phase and switching on-periods for the first and the second flyback circuits are equal.

* * * * *